(12) United States Patent
Huang et al.

(10) Patent No.: US 7,873,964 B2
(45) Date of Patent: Jan. 18, 2011

(54) KERNEL FUNCTIONS FOR INTER-PROCESSOR COMMUNICATIONS IN HIGH PERFORMANCE MULTI-PROCESSOR SYSTEMS

(75) Inventors: Kaiyuan Huang, Ottawa (CA); Michael F. Kemp, Ottawa (CA); Ernst Munter, Ottawa (CA); Venkatesh Bathala, Nepean (CA); Damodharan Narayanan, Kanata (CA)

(73) Assignee: Liquid Computing Corporation, Ottawa (CA)

( * ) Notice: Subject to any disclaimer, the term of this patent is extended or adjusted under 35 U.S.C. 154(b) by 1083 days.

(21) Appl. No.: 11/554,535

(22) Filed: Oct. 30, 2006

(65) Prior Publication Data

US 2008/0148291 A1 Jun. 19, 2008

(51) Int. Cl.
*G06F 3/00* (2006.01)
*G06F 9/44* (2006.01)
*G06F 9/46* (2006.01)
*G06F 13/00* (2006.01)

(52) U.S. Cl. ..................... 719/314; 719/313
(58) Field of Classification Search ............... 719/314
See application file for complete search history.

(56) References Cited

U.S. PATENT DOCUMENTS

| | | |
|---|---|---|
| 4,841,526 A | 6/1989 | Wilson et al. |
| 5,390,299 A | 2/1995 | Rege et al. |
| 5,453,982 A | 9/1995 | Pennington et al. |
| 5,469,571 A | 11/1995 | Bunnell |
| 5,644,569 A | 7/1997 | Walker |
| 5,652,885 A * | 7/1997 | Reed et al. ............... 713/1 |
| 5,664,145 A | 9/1997 | Apperley et al. |
| 5,701,502 A | 12/1997 | Baker et al. |
| 5,721,820 A | 2/1998 | Abali et al. |
| 5,832,240 A | 11/1998 | Larsen et al. |
| 5,852,602 A | 12/1998 | Sugawara |
| 5,875,343 A * | 2/1999 | Binford et al. ............... 710/263 |
| 5,918,055 A | 6/1999 | Crawford et al. |
| 5,987,495 A | 11/1999 | Ault et al. |
| 6,098,105 A * | 8/2000 | Desnoyers et al. .......... 709/237 |
| 6,151,639 A | 11/2000 | Tucker et al. |
| 6,161,152 A | 12/2000 | Garg et al. |
| 6,181,704 B1 | 1/2001 | Drottar et al. |
| 6,408,351 B1 | 6/2002 | Hamdi et al. |

(Continued)

OTHER PUBLICATIONS

Office Action issued in U.S. Appl. No. 11/761,865, mailed Dec. 23, 2009.

(Continued)

*Primary Examiner*—Diem K Cao
(74) *Attorney, Agent, or Firm*—DLA Piper LLP US

(57) ABSTRACT

In a multi-processor system with a high degree of inter processor communication, an operating system extension is described as a kernel function to poll a receive buffer. This is an opportunistic poll that continues to run in the user context after an application process has invoked the kernel with a blocking receive function. It is also running whenever no higher priority task is running. New data packets may be received for the present user application process while avoiding context switches, and for a different user process while avoiding interrupts. A hardware implemented delay timer and a buffer fill monitor generate interrupts when the system is not polling, thus guaranteeing a maximum latency and preventing buffer overflow, but these interrupts are largely avoided by polling when the system is handling a large amount of inter processor data traffic.

33 Claims, 5 Drawing Sheets

U.S. PATENT DOCUMENTS

| | | | |
|---|---|---|---|
| 6,425,038 | B1 | 7/2002 | Sprecher |
| 6,453,360 | B1 | 9/2002 | Muller et al. |
| 6,459,698 | B1 | 10/2002 | Acharya |
| 6,539,436 | B2 | 3/2003 | Garrigues et al. |
| 6,628,965 | B1 | 9/2003 | Larosa et al. |
| 6,779,050 | B2 | 8/2004 | Horton et al. |
| 6,781,992 | B1 | 8/2004 | Rana et al. |
| 6,792,492 | B1 | 9/2004 | Griffin |
| 6,832,261 | B1 | 12/2004 | Westbrook et al. |
| 6,895,010 | B1 | 5/2005 | Chang et al. |
| 6,914,877 | B1 | 7/2005 | Alamineh |
| 6,978,312 | B2 | 12/2005 | Eydelman et al. |
| 7,133,407 | B2 | 11/2006 | Jinzaki et al. |
| 7,139,268 | B1 | 11/2006 | Bhagwat et al. |
| 7,266,688 | B2 | 9/2007 | Fronberg |
| 7,409,468 | B2 | 8/2008 | Biran et al. |
| 7,478,138 | B2 | 1/2009 | Chang et al. |
| 7,512,128 | B2 | 3/2009 | DiMambro et al. |
| 7,561,567 | B1 | 7/2009 | Olson et al. |
| 7,580,519 | B1 | 8/2009 | Goh |
| 2002/0004842 | A1 | 1/2002 | Ghose et al. |
| 2002/0009075 | A1 | 1/2002 | Fesas, Jr. |
| 2002/0016851 | A1 | 2/2002 | Border |
| 2002/0032821 | A1 | 3/2002 | Garrigues et al. |
| 2002/0138790 | A1 | 9/2002 | Nishtala |
| 2003/0035420 | A1 | 2/2003 | Niu |
| 2004/0030745 | A1 | 2/2004 | Boucher et al. |
| 2004/0062201 | A1 | 4/2004 | Deshpande |
| 2004/0088641 | A1 | 5/2004 | Torsner et al. |
| 2004/0133802 | A1 | 7/2004 | Liu |
| 2004/0165588 | A1 | 8/2004 | Pandya |
| 2004/0205769 | A1* | 10/2004 | Ruutu ................... 719/313 |
| 2004/0215847 | A1* | 10/2004 | Dirstine et al. ........... 710/38 |
| 2004/0218623 | A1 | 11/2004 | Goldenberg et al. |
| 2005/0053084 | A1 | 3/2005 | Abrol et al. |
| 2005/0091383 | A1 | 4/2005 | Bender et al. |
| 2005/0091502 | A1 | 4/2005 | Cargille et al. |
| 2005/0157757 | A1 | 7/2005 | Thudt |
| 2005/0185604 | A1 | 8/2005 | Agarwal |
| 2005/0198350 | A1 | 9/2005 | Tan et al. |
| 2005/0223118 | A1 | 10/2005 | Tucker et al. |
| 2005/0238057 | A1 | 10/2005 | Toma et al. |
| 2006/0013258 | A1 | 1/2006 | Banerjee et al. |
| 2006/0047875 | A1 | 3/2006 | Aguilar, Jr. et al. |
| 2006/0064621 | A1 | 3/2006 | Fuh et al. |
| 2006/0101178 | A1 | 5/2006 | Zhong et al. |
| 2006/0101473 | A1* | 5/2006 | Taylor et al. ............ 719/314 |
| 2006/0136570 | A1 | 6/2006 | Pandya |
| 2006/0221953 | A1 | 10/2006 | Basso et al. |
| 2006/0259487 | A1 | 11/2006 | Havens et al. |
| 2006/0268688 | A1 | 11/2006 | Isozu |
| 2007/0005827 | A1* | 1/2007 | Sarangam et al. ........... 710/46 |
| 2007/0118841 | A1* | 5/2007 | Driver et al. ........... 719/314 |
| 2007/0291778 | A1 | 12/2007 | Huang et al. |
| 2007/0294426 | A1 | 12/2007 | Huang et al. |
| 2007/0299970 | A1 | 12/2007 | Huang et al. |

OTHER PUBLICATIONS

Jiuxing Liu et al., MPI OVer InfiniBand: Early Experiences:, Network-Based Computing Laboratory Computer and Information Science, Ohio State University, Aug. 2003, 16 pages.

Notice of Allowance issued in U.S. Appl. No. 11/761,840, mailed Dec. 14, 2009.

Office Action issued in U.S. Appl. No. 11/761,865, mailed Dec. 11, 2009.

Citation containing the publication date for Swift, Michael M. et al., "Improving the reliability of commodity operating systems". In ACM Transactions on Computer Systems (TOCS), vol. 23, No. 1, pp. 77-110. Published Feb. 2005 (retrieved Mar. 19, 2008 from the internet: http://portal.acm.org/citation.cfm?id=1047919.

Swift, Michael M. et al. "Improving the reliability of commodity operating systems". In ACM Transactions on Computer Systems (TOCS), vol. 23, No. 1, pp. 77-110. Publishing February, http://www.scs.stanford.edu/nyu/04fa/sched/readings/nooks.pdf, 2004.

International Search Report mailed Apr. 10, 2008, in corresponding International Application No. PCT/US07/79102, filed Sep. 20, 2007.

Written Opinion mailed Apr. 10, 2008, in corresponding International Application No. PCT/US07/79102, filed Sep. 20, 2007.

International Search Report issued in International Application No. PCT/IB2006/004296, mailed Feb. 10, 2008.

Written Opinion issued in International Application No. PCT/IB2006/004296, mailed Feb. 10, 2008.

International Preliminary Report on Patentability issued in International Application No. PCT/IB2006/004296, mailed May 14, 2008.

Office Action issued in U.S. Appl. No. 11/535,258, mailed Sep. 1, 2009.

International Search Report issued in International Application No. PCT/US2007/071031, mailed Feb. 4, 2008.

Written Opinion issued in International Application No. PCT/US2007/071031, mailed Feb. 4, 2008.

International Preliminary Report on Patentability issued in International Application No. PCT/US2007/071031, mailed Dec. 22, 2008.

International Search Report issued in International Application No. PCT/US2007/071036, mailed Jun. 10, 2008.

Written Opinion issued in International Application No. PCT/US2007/071036, mailed Jun. 10, 2008.

International Preliminary Report on Patentability issued in International Application No. PCT/US2007/071038, mailed Dec. 22, 2008.

International Search Report issued in International Application No. PCT/US2007/071038, mailed Aug. 21, 2008.

Written Opinion issued in International Application No. PCT/US2007/071038, mailed Aug. 21, 2008.

International Preliminary Report on Patentability issued in International Application No. PCT/US2007/071040, mailed Dec. 22, 2008.

International Search Report issued in International Application No. PCT/US2007/071040, mailed Oct. 1, 2008.

Written Opinion issued in International Application No. PCT/US2007/071040, mailed Oct. 1, 2008.

"Message Passing Interface (MPI)", http://www.llnl.gov.computing/tutorials/mpi, printed Mar. 8, 2007.

"GASNet Specification", Version 1.8, Released Nov. 2, 2006, Editor: Dan Bonachea, bonacheas@cs.berkeley.edu, http://gasnet.cs.berkely.edu.

Office Action issued in U.S. Appl. No. 11/761,885, mailed Sep. 17, 2008.

Office Action issued in U.S. Appl. No. 11/761,885, mailed Feb. 4, 2009.

Office Action issued in U.S. Appl. No. 11/761,885, mailed Aug. 24, 2009.

Office Action issued in U.S. Appl. No. 11/761,804, mailed Aug. 22, 2008.

Office Action issued in U.S. Appl. No. 11/761,804, mailed Jan. 8, 2009.

Notice of Allowance issued in U.S. Appl. No. 11/761,804, mailed Aug. 7, 2009.

Office Action issued in U.S. Appl. No. 11/761,827, mailed Oct. 5, 2009.

UPC Consortium, "UPC Language Specifications V1.2", pp. 1-129, May 31, 2005.

Linux Kernel Development Second Edition by Robert Love, ISBN: 0672327201, "Chapter 4. Process Scheduling", pp. 1-19, Jan. 12, 2005.

Information Sciences Institute, "Transmission Control Protocol, DARPA Internet Program, Protocol Specification, Sep. 1991" pp. i-85.

Supported by ARPA and NSF under grant ASC-9310330, the National Science Foundation Science and Technology Center Cooperative Agreement No. CCR-8809615, and by the Commission of the European Community through Esprit project P6643, "MPI: A message-passing interface standard, Message passing interface forum, Nov. 15, 2003."

File History of U.S. Appl. No. 11/535,258, electronically captured from PAIR on Jul. 6, 2010.
File History of U.S. Appl. No. 11/761,804, electronically captured from PAIR on Jul. 6, 2010.
File History of U.S. Appl. No. 11/761,827, electronically captured from PAIR on Jul. 6, 2010.
File History of U.S. Appl. No. 11/761,865, electronically captured from PAIR on Jul. 6, 2010.
File History of U.S. Appl. No. 11/761,885, electronically captured from PAIR on Jul. 6, 2010.

* cited by examiner

KERNEL FUNCTIONS FOR INTER-PROCESSOR COMMUNICATIONS IN HIGH PERFORMANCE MULTI-PROCESSOR SYSTEMS

BACKGROUND OF THE INVENTION

1. Field of the Invention

The present invention relates to multi processor systems, such as High Performance Computing (HPC) systems with a high degree of inter-processor communication.

2. Description of the Related Information

Communication between software entities (applications) on different host computers is frequently carried in packets over standard transmission protocols, such as TCP. Many application programs may be running concurrently on each computer, and methods have been developed to allow such programs to communicate independently. The operating system in each computer, specifically the part of the operating system referred to as the "operating system kernel" or "kernel", has the task of managing the processes under which the application programs run. The kernel also provides the communications services for the entire computer, in that it mediates between the application programs and the hardware such as Ethernet interfaces or customized I/O interfaces that provide the circuitry for receiving and sending data packets. An example of an operating system so structured is Linux.

In a system such as a massively parallel multi-processor system, or "super computer" that contains a large number of computing modules, a very large number of communication paths may be required to carry data from the memories of one computing modules to the memories or the CPU the other computing modules. A common example of a distributed application in which such data communication occurs is the computation of certain mathematical algorithms such as matrix multiplication. A full mesh interconnection of N computing modules would require $N \times (N-1)$ independent data communication paths to allow every computing module to communicate directly with each of the other computing modules.

State of the art HPC systems are multi-processor systems with a high degree of inter-processor communication. Such systems are designed to provide the capability to run distributed applications. A distributed application may be designed using the Message Passing Interface (MPI) library for inter-process communication. Another method of programming an HPC system or super computer is based on the UPC (Unified Parallel C) programming language, which provides programmers with the capability to write a single program that will run on the multiple CPUs of the system while using the memory units of the CPUs as a shared distributed memory. Both the MPI standard, published as "MPI: A message-Passing Interface Standard, November 2003, © 1993, 1994, 1995, University of Tennessee, Knoxville Tenn.) and the UPC programming language specification (published by the UPC Consortium, May 2005) are hereby incorporated by reference in their entireties.

In either case, the communication path from one process running in one computer to another process running in another computer must by necessity traverse a physical interconnect network as well as the software/hardware interface in each computer. Modern computer operating systems such as Linux are multi-tasking process oriented and include a kernel that schedules the processes (e.g. application processes) to run, and that provides the interfacing to the hardware input/output (I/O) devices.

The overhead, both in terms of processing power and latency that is associated with the inter-process communication based on standard protocols, is a major performance bottleneck in HPC systems. This overhead includes the number of CPU cycles associated with context switching between application processes, and the corresponding memory accesses. Commonly assigned U.S. patent applications "High Performance Memory Based Communications Interface", Ser. No. 60/736,004, filed on Nov. 12, 2005 and "Methods And Systems For Scalable Interconnect", Ser. No. 60/736,106, filed on Nov. 12, 2005 disclose data communications protocols that may be advantageously used to reduce latency. The goal of high performance computing is to apply the combined CPU instruction cycles, measured in Teraflops or Petaflops, of many CPUs to solving a computational problem. Inter-processor communication is a necessary evil, and any CPU cycles spent while a CPU is waiting for data to arrive are cycles that are not available for problem solving.

The latency, from one running application process in one CPU to an application process in another CPU, is the sum of the hardware delay, the communications protocol processing in the kernels of both CPUs, and the interaction between the kernel and the I/O hardware. In order to achieve very high performance in a distributed multi-processor system, any reduction in this latency is believed to be valuable and worthwhile.

SUMMARY OF THE INVENTION

Accordingly, an embodiment of the present invention is a method for operating a computer, the computer having a multi-tasking operating system that includes a user space and a kernel in a kernel space, a receive buffer and a plurality of application processes, each of the plurality of application processes including a user application that runs in the user space. The method may include steps of polling the receive buffer from a user polling function that runs in the kernel space; receiving in the receive buffer a data packet having a header and user data; reading the header of the received data packet; identifying a target application process of the plurality of application processes from the read header; delivering the user data to the identified target application process, and if the identified target application process is in a blocked state, changing the blocked target application process to an unblocked state.

Each of the plurality of application processes may be associated with a process context and the method may further include a step of discarding the data packet if the process context of the target application process does not exist. The polling step may be carried out by a polling application processes that includes the user polling function. The target application process in the delivering step may be a polling application process or a non-polling application process that does not include the user polling function. The polling step may be carried out as long as the receive buffer is empty and no other application process is ready to run. The method may further include a step of each of the plurality of application processes assuming the blocked state when it is waiting for user data. After the polling step is carried out by a first user polling function of a first application process of the plurality of application processes and after the identifying step identifies the target application process as a second one of the plurality of application processes, the method further may include a step of the first application process assuming the blocked state. The polling step may be carried out such that after a first application process of the plurality of application processes issues a blocking receive call to indicate that it is ready to receive data, the polling step is carried out to poll the receive buffer and the method further may include a step of copying the user data from the receive buffer to the user space of the first application process if the identified target application process is the first application process. The method may further include a step of each of the plurality of application processes assuming the blocked state after its associated user application issues a blocking receive call to the kernel indicating that the issuing user application is waiting for data and the identifying step identifies the target application process as being an other one of the plurality of application processes. The kernel may further carry out a step of changing the other one of the plurality of application processes to the unblocked state to enable the unblocked user application to receive and process the user data of the data packet received in the receive buffer. When the identified target application process is not yet waiting for the data packet received in the receive buffer, the method further may include a step of the kernel sending the user data to a queue from which the identified target application process can remove the user data after having issued a blocking receive call to indicate to the kernel that it is waiting for data, but before the identified target application process assumes the blocked state. The method may further include a step of generating a receive buffer interrupt signal after a selectable period of time, the selectable period of time being configured to be started each time a new data packet arrives at an input of the receive buffer, unless the selectable period of time has at least already partially elapsed. The method may also include a step of clearing the selectable period of time when the polling step is carried out. A step of programmatically setting the selectable period of time may also be carried out. The fill level of the receive buffer may be monitored, and a receive buffer fill interrupt signal may be generated when the receive buffer fills to a selectable fill level. The kernel may include a kernel polling thread, and the method further may include a step of the kernel polling thread polling the receive buffer when none of the plurality of application processes are running or are ready to run. The kernel polling thread polling step may be carried out persistently, yielding and suspending execution only temporarily when one of the plurality of application processes is ready to run. After the kernel polling thread polling step, the method further may include steps of, when a data packet is present in the receive buffer, reading the header of the data packet, identifying the target application process for the user data from the read header, delivering the user data to the identified target application process and changing the state of the target application process to the unblocked state if the target application process is in the blocked state.

According to another embodiment, the present invention is also a computer that may include a multi-tasking operating system having a user space and a kernel in a kernel space; a receive buffer, configured to receive a data packet having a header and user data; a plurality of application processes, each of the plurality of application processes including a user application that runs in the user space, at least one of the plurality of application processes being polling application processes that also include a user polling function that runs in the kernel space, each of the plurality of application process being configured to assume an unblocked or a blocked state, the user polling function being configured to poll the receive buffer and, when a data packet is present in the receive buffer, to read the header of the data packet, to identify a target application process for the data packet from the read header, to deliver the user data to the identified target application process and to change a state of the target application process to the unblocked state if the target application process is in the blocked state.

Each of the plurality of application processes may be associated with a process context and the kernel may be further configured to discard the data packet if the process context of the target application process does not exist. The user polling function may be configured to poll the receive buffer as long as the receive buffer is empty and no other application process is ready to run. Each of the plurality of application processes may be configured to assume the blocked state when waiting for user data. The user polling function of each of the at least one polling application process may be configured to cause its application process to assume the blocked state when the target application process is identified as a application process of the plurality of application processes other than itself. The user polling function of each of the at least one polling application process may be configured such that after a first polling application process makes a blocking receive call to the kernel to indicate that it is ready to receive data, but before the first polling application process assumes the blocked state, the user polling function polls the receive buffer and copies the user data from the receive buffer to the user space of the first polling application process if the identified target application process is the first polling application process. Each of the plurality of application processes may be configured to assume the blocked state after making a blocking receive call to the kernel indicating that the issuing user application is waiting for data and a new data packet for an other one of the plurality of application processes is received in the receive buffer. The kernel may be configured to change the other one of the plurality of application processes to the unblocked state to enable the user application of the unblocked application process to receive and process of the user data received in the receive buffer. When the identified target application process is not yet waiting for the user data in the data packet received in the receive buffer, the kernel may be configured to send the user data to a queue from which the identified target application process can remove the user data after having issued a receive blocking call to indicate to the kernel that it is waiting for data, but before the identified target application process assumes the blocked state. The computer may also include a delay timer configured to generate a receive buffer delay interrupt signal after a selectable period of time, the delay timer being configured to be started each time a new data packet arrives at an input of the receive buffer, unless the selectable period of time has at least already partially elapsed. The delay timer may be configured to be cleared when the user polling function reads the header of the data packet from the receive buffer. The selectable period of time may be programmatically selectable. The computer may also include a fill level monitor coupled to the receive buffer, the fill level monitor being configured to monitor a fill level of the receive buffer and to generate a receive buffer fill interrupt signal when a selectable receive buffer fill level is reached. The kernel further may include a kernel polling thread that is configured to poll the receive buffer when none of the plurality of application processes are running or are ready to run. The kernel polling thread may be configured to run persistently, yielding and suspending execution only temporarily when one of the plurality of application processes is ready to run. The kernel polling thread may be configured to poll the receive buffer and, when a data packet is present in the receive buffer, to read the header of the data packet, to identify a target application process for the user data from the read header, to deliver the user data to the identified target application process, and to change the state of the target application process to the unblocked state if the target application process is in the blocked state.

BRIEF DESCRIPTION OF THE DRAWINGS

In order to facilitate a more full understanding of the present invention, reference is now made to the appended drawings. These drawings should not be construed as limiting the present invention, but are intended to be exemplary only.

DETAILED DESCRIPTION

Figure 1:
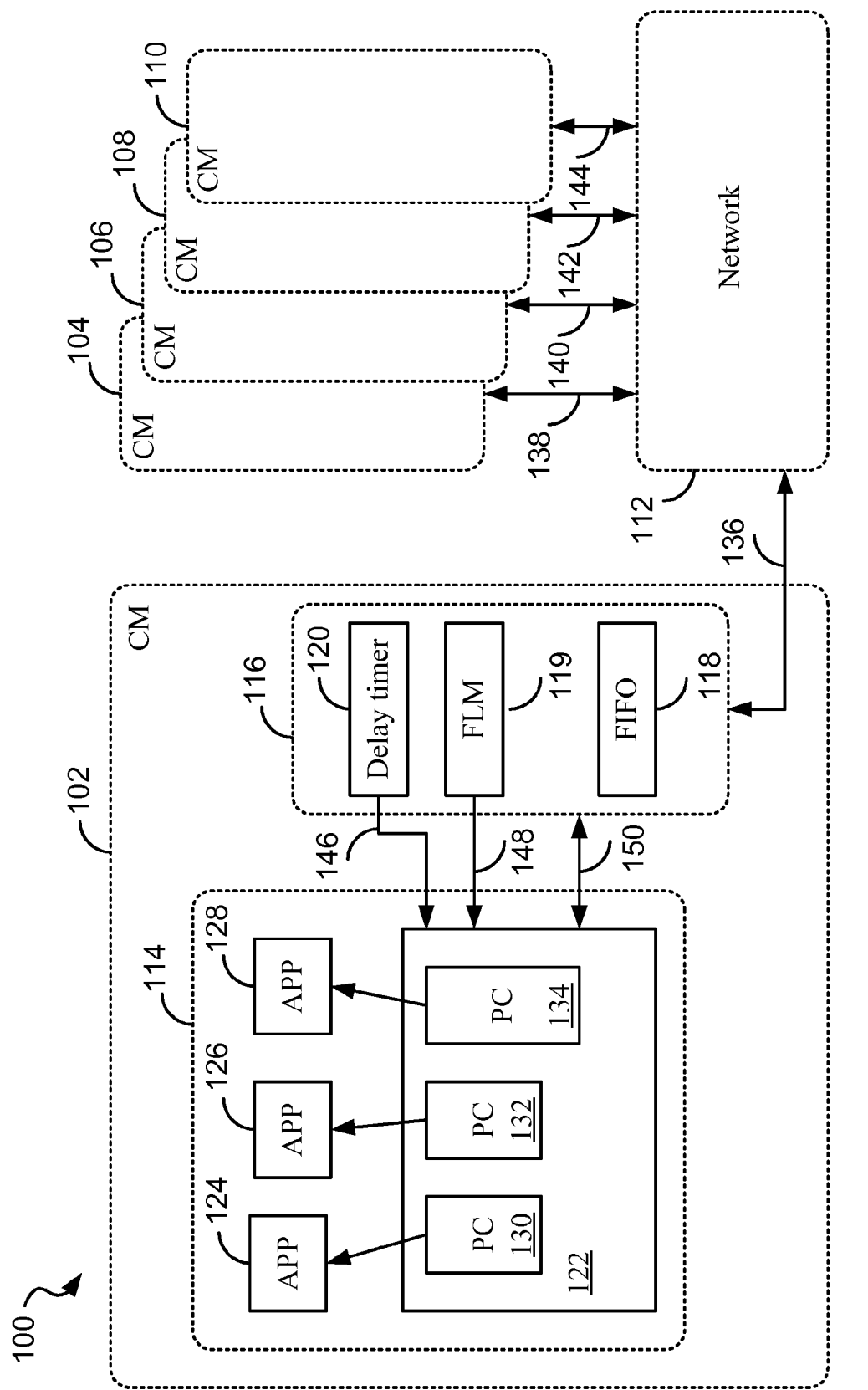
FIG. 1 is a block diagram of a multi-processor system 100 according to an embodiment of the present invention.

FIG. 1 is a block diagram of a HPC system 100 according to an embodiment of the present invention. The HPC system 100 includes a plurality of computing modules (CM) 102, 104, 106, 108 and 110 and a network 112. As the computing modules 102 to 110 may be similar to one another, only the CM 102 is shown in further detail. The CM 102 is referred to herein as the "local CM", whereas the other CMs 104 to 110 are referred to as "remote CMs", meaning the CMs 104 to 110 may be remote to the CM 102. The CM 102 may include software 114 and hardware 116. As shown, the hardware 116 may include a receive FIFO 118, a Delay Timer 120, and a Fill-Level Monitor (FLM) 119. The hardware 116 may further include a computing hardware platform (not shown) on which the software 114 may be executed. The software 114 may include an operating system kernel 122 and one or more application processes (APP), as shown at reference numerals 124, 126 and 128. In FIG. 1, three application processes (APP 124 to 128) are shown for illustrative purposes, although embodiments of the present inventions are not to be limited thereby. The kernel 122 may include a number of process contexts (PC) 130, 132 and 134, where each of the PCs 130 to 134 is associated with one of the APPs 124 to 128 respectively.

Bidirectional links 136 to 144 couple the CMs 102 to 110 to the network 112, respectively, enabling any one of the CMs 102 to 110 to send data packets to any other one of the CMs 102 to 110.

The kernel 122 of the CM 102 may be logically linked with the hardware 116 through a delay interrupt link 146, a FIFO-interrupt link 148, and a control link 150.

One or more of the APPs 124 to 128 may be compiled, for example, with the Message Passing Interface (MPI) library that provides a convenient programming method for process-to-process communication between processes (i.e. APPs) within the same CM, as well as between processes in different CMs. Although this embodiment of the present invention is described relative to MPI, other multi-processing or distributed processing conventions that make use of packet-based communication may be used, as may be appropriate. Furthermore, although embodiments of the present invention are illustrated with the simplified example of a hardware implementation based on a number of distinct CMs using packet communications over a network or switching fabric, other implementations are possible, including the use of symmetric multi-processing (SMP), multi-core computing modules, and bus based communications, as those of skill in this art may appreciate.

The APP 128 and its relationship with the kernel 122 is described below in greater detail. The APPs 124 to 128 may be application processes of various kinds, but for the exemplary and illustrative purposes herein, each of the APPs is either a "polling task" or a "non-polling task", for reasons that will become clear in the description below. Briefly, a "non-polling task" is an interrupt-driven application process, in the commonly understood sense, while a "polling task" is an application process enhanced by an embodiment of the present invention. For the purposes of this description, the description below assumes the APP 124 be a "non-polling task" and the APPs 126 and 128 to be "polling tasks".

Data may be sent from a process in any CM, for example a remote APP (not illustrated) in one of the remote CMs 104 to 110 to the APP 128 in the CM 102. Using MPI, this may be accomplished in a number of ways. For example, the sending APP calls an MPI "send" function to send data to the receiving APP 128. Independently, but at approximately the same time, the APP 128 issues a blocking MPI "receive" call. After the APP 128 has issued the MPI "receive", the APP 128 is suspended by the kernel (blocked) until the expected data has been sent from the remote CM through the network 112 to the local CM 102, and received (recognized) by the kernel 122 to be made available to the receiving APP 128.

The data arrives in the hardware 116 of the local CM 102 from the network 112 over the link 136, and is stored in the FIFO 118. The arriving data may come in a single packet or in a stream of packets that are destined for the receiving application process (APP 128 in the example). Other packets may also arrive from the same or other remote CMs, and may be destined for the same or another APP on the CM 102.

Conventionally, the arrival of data would result in an interrupt to be processed by the kernel. The kernel would read the data, determine the target application, deliver the data into the data space of the application, and reschedule the application if it was blocked and waiting for the data. If the application was not blocked, the kernel could hold the data in a system buffer until the application requests it. It is believed advantageous to avoid this interrupt and its associated cost in terms of context switching, including memory page management.

One solution to avoid might be a user space polling method. User space polling basically would require the mapping of the hardware to the user application space (with one privileged process) and allow the application full control of the hardware in terms of sending and receiving packets. As a result, the operating system kernel would be completely bypassed and thus the overhead as well. The main difficulty with this approach is that sharing of the hardware becomes troublesome and counter-productive for performance if sharing between multiple processes is required. In the latter case, the (privileged) user space program would become a proxy and may even require other kernel agents for coordination. Reliability and security are among other problems, as those of skill in this art may recognize.

Accordingly, an embodiment of the present invention adds certain polling functions (to be described in detail below) to the kernel, thus preserving the strict separation of the user applications from the operating system, which remains in full control of the hardware. The interaction between the software 114 and the hardware 116 is further described hereunder, relative to FIG. 1. According to an embodiment of the present invention, data packets arriving over the link 136 are stored in the FIFO 118. The software 114, specifically the kernel 122, may become aware of the presence of available data packets in the FIFO 118 by, for example, one of three means: the delayed interrupt coupled from the Delay Timer 120 over the delayed interrupt link 146; the FIFO interrupt coupled from the FLM 119 over the FIFO-interrupt link 148; or by polling the FIFO directly over the control link 150.

Hardware/Software Interaction

Figure 2:
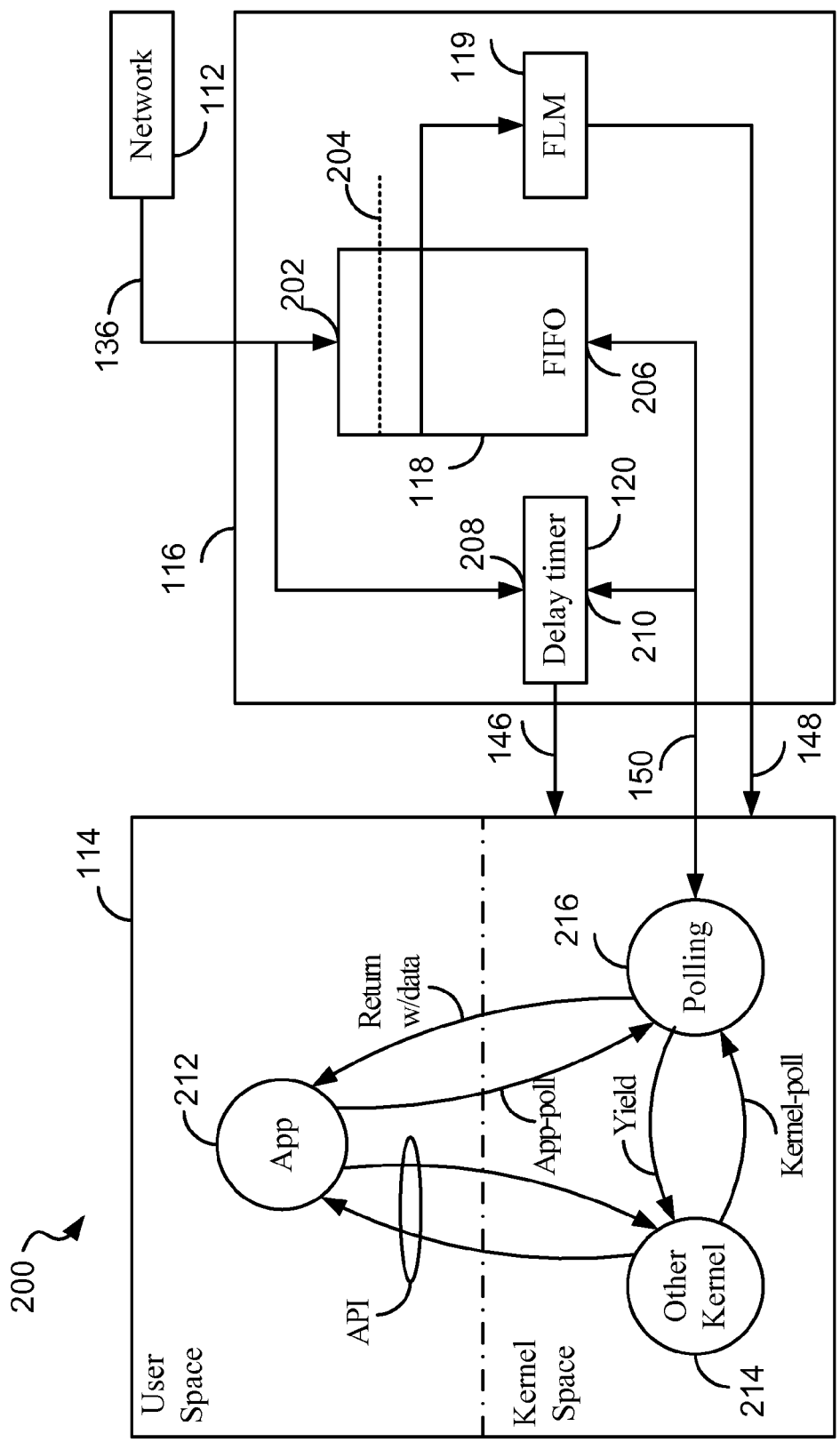
FIG. 2 is a detailed block diagram 200 illustrating implementation details of the hardware/software interaction that takes place in the CM 102 of the multi-processor system 100 of FIG. 1.

FIG. 2 is a detailed block diagram 200 illustrating details of the hardware/software interaction that takes place in the CM 102, according to an embodiment of the present invention. The same reference numerals are used in the block diagram 100 and the detailed block diagram 200, where such reference numerals refer to the same structure or function. As shown in FIG. 2, the block diagram 200 shows the hardware 116, the software 114, and the network 112, which are shown to be interconnected by the links 136, 146, 148, and 150. The illustrated hardware 116 includes the FIFO 118, the FLM 119, and the Delay Timer 120 (as in FIG. 1). FIG. 2 also shows a FIFO input 202 connected to receive packets over the link 136 to the network 112; a FIFO threshold 204 representing a predetermined fill level in the FIFO 118; a FIFO output 206 coupled to the link 150 over which the software 114 (when in the polling state) may read the contents of the FIFO 118; a timer "set" input 208 for starting the Delay Timer 120, which Delay Timer will the expire (fire) after a predetermined delay, and a timer "clear" input 210 for stopping the Delay Timer 120, i.e. preventing it from firing.

The software 114 is illustrated in the detailed block diagram 200 in a different aspect. The software 114 is divided into a User Space and a Kernel Space, showing a simple state diagram having three states in which a process or task may be running: an application state (App) 212, an "other kernel" state 214, and a new inventive polling state 216. When in the App state 212, the software runs in the User Space, meaning that it runs an application (e.g. the APP 128 of FIG. 1) with user privileges and is restricted to accessing the resources (memory) made available to it by the kernel. When in the other kernel state 214, the software is dealing with interrupts and running any other conventional kernel task. When in the polling state 216, the software is interacting with the hardware 114, specifically with the FIFO 118 and the Delay Timer 120. Attention is drawn to the polling state 216 which (in conjunction with the illustrated hardware objects 118, 119, and 120) embodies the aspects of embodiments of the present invention. When running in the kernel space (the other kernel state 214 and the polling state 216), the software runs with full privileges and is able to access all resources. The software model and the embodiments of the present invention presented herein are based on the Linux operating system, but the scope of the inventions also extend beyond the Linux implementation to include other software systems in which applications and kernel are differentiated by hardware/memory privileges or protection levels.

According to embodiments of the present invention, transitions between the three illustrated states may include:

a process running in the App state 212 invokes tasks in the other kernel state 214 through a standard application program interface (API), as commonly understood by persons conversant with software practice;

a process running in the App state 212 may be a "polling" application (e.g. the APP 128 of FIG. 1) in which case it may transition into the polling state 216 to run a polling task (App-poll) when it is expecting data from the network, and return from the polling state 216 when the data are available (Return w/data); and the polling state 216 may be entered from the other kernel state 214, for example when no higher priority task is ready to run (Kernel-poll), and return to the other kernel state 214 when the polling state 216 gives up control voluntarily (yield).

The operation of the polling tasks that run in the polling state 216 is described in more detail below, relative to FIGS. 3, 4, and 5. The detailed interaction between the software 114 and the hardware 116 is further described herein below, in conjunction with FIG. 2. A new data packet arriving from the network 112 over the link 136 is entered into the FIFO 118 by way of the FIFO input 202. The arrival of the new data packet also sets (starts) the Delay Timer 120 by way of its "set" input 208. If the software 114 is in the polling state 216, and the FIFO 118 was empty immediately before the arrival of the new data packet, the software will immediately (on the next polling cycle) discover the presence of the new data packet in the FIFO 118 and read it over the control link 150, thus removing it from the FIFO 118. At the same time, the "clear" input 210 of the Delay Timer 120 is activated, stopping the timer to avoid the interrupt that would have occurred if the Delay Timer 120 had been allowed to continue and fire.

However, the software 114 may not have been in the polling state 216 when the new data packet arrived in the FIFO 118, for example because an application process (in the App state 212) was busy computing. In this case, the Delay Timer 120 will fire after its predetermined delay and present an interrupt (the delay interrupt) over the delay interrupt link 146 as described earlier.

The predetermined delay of the Delay Timer 120 is set to be sufficiently long to bridge the polling cycle of the polling task running in the polling state 216, but short enough to provide a guarantee of a tolerable maximum latency. The Delay Timer 120 may be restarted each time a new data packet arrives over the link 136, regardless of the state of the fill-state of the FIFO 118. Thus, if a burst of packets were to arrive in rapid succession, the Delay Timer 120, being constantly restarted, would not fire for a long period—while the FIFO 118 fills up with data packets. If at this time, the software 114 is not polling (not in the polling state 216) and consequently not reading the FIFO 118, the FIFO 118 might overflow and data packets would be lost. In a preferred embodiment, therefore, the Delay Timer 120 is not restarted with newly arriving data packets if it is already running. This guarantees a maximum tolerable latency.

The FLM 119 in the hardware 116 monitors (constantly) the fill level of the FIFO 118, and upon reaching the predetermined threshold 204, sends the FIFO interrupt to the software 114 over the FIFO interrupt link 148. In a preferred embodiment, the Fill Level Monitor 119 is set to accommodate burst traffic which may arrive within the timeout period of the Delay Timer 120 thus preventing overflow of the FIFO 118.

In the interest of low latency and avoiding the cost (in terms of CPU cycles) of interrupts, the software should be in the polling state 216 whenever data packets are received or expected to arrive in the FIFO 118. In this way, the interrupts associated with data arrival (the delay interrupt and the FIFO interrupt) can be largely avoided.

Received packets are best processed and handed over to the destined (target) application process when the application process is ready to receive them. If a packet arrives but the application process is not ready to receive it, for example when it is still busy computing, it does not do any good to interrupt the busy application process, only to resume the busy processing of the application process later. If the application process has not posted a receive (issued the MPI "receive" function call for example), the received data cannot be copied to the application designated receive buffer either and has to stay in a system buffer anyway. It does, however, help to remove the packet from the head of the FIFO, which means that the subsequently arrived packets can already be processed—these might be destined for a different process. The delayed interrupt thus helps provide a guarantee of a tolerable maximum latency and prevent the FIFO from overflowing. The computing time as well as latency savings are two-fold: interrupts are eliminated statistically (for example, on a 2 GHz AMD Opteron processor, overhead processing related to interrupt handling costs microseconds) and the frequency of process context switching is reduced. A process context switching may cost many microseconds, and the main cost that is avoided is repagination, that is the memory management associated with virtual memory when switching between user processes. In switching between kernel threads or between a kernel thread and a user process, there may not be a need for repagination.

Embodiments of the present invention may be configured to present the received data to the target application process when it needs it, let the target application process come to pick it up (saving interrupt and context switching costs), and use the interrupts (146 and 148) only to provide a tolerable maximum latency guarantee and to prevent the FIFO 118 from overflowing.

Returning to the system view shown in FIG. 1, the kernel 122 may respond to the interrupts (the timer interrupt from the Delay Timer 120 over the delay interrupt link 146, or the FIFO-interrupt link 148) by:

- reading the header of the first data packet in the FIFO 118 over the control link 150;
- from the header, identifying the target application process (the APP 128 in the example);
- retrieving the associated process context (the PC 134 in the example);
- copying the payload of the data packet to the memory space of the target application process (APP 128) if the target application process is blocked (i.e. waiting for the data), or to system memory otherwise; and
- rescheduling the application process (APP 128) if the application process if it was blocked.

The kernel 122 may continue reading and processing packets from the FIFO 118 as long as packets are available in the FIFO. It is to be understood that the preceding description is a simplified view of the hardware/kernel interaction, and that many details known to those of skill in this art have been left out for the sake of clarity.

In the HPC system 100, the end-to-end latency may be defined as the time that elapses from the sending of data by the remote application process, and the receiving of the data by the local application process ready for processing. In the interest of computational efficiency, this latency must be as small as possible. The latency includes many components, both hardware and software related, and it is important to address every single one of these. The processing of interrupts, including the context switching between the interrupted process and the application process that will run as a result of the interrupt, is a major component in the latency. Embodiments of the present inventions relate to techniques to reduce latency by avoiding many interrupts altogether, and to reduce context switching.

The polling state 216 (FIG. 2) is useful in reducing latency by avoiding most or all interrupts in HPC applications. It is realized in the form of a "kernel polling method" (a set of polling functions) that is described in greater detail below, with the aid of flow diagrams in FIGS. 3, 4, and 5. A kernel polling method according to an embodiment of the present invention includes extending the capability of the kernel in a multitasking operating system, to allow certain applications to poll the receive FIFO after issuing a "receive" call, instead of blocking immediately. A multiprocessor system such as the HPC system 100 FIG. 1 frequently will be running processor intensive applications that communicate with each other, under a multitasking operating system such as, for example, Linux. Each of the computing modules (e.g. CM 102 to 110) may individually include multiple CPUs in an SMP configuration, but overall, the HPC 100 as a whole may be built on a non-uniform memory architecture (NUMA) with packet-based inter-processor communication. When running a high-performance distributed application, e.g. a numerical ("number crunching") application, it is desired that each processor's resources be dedicated to performing the application processing task as efficiently as possible, with few processing resources (instruction cycles) lost to servicing the inter-process communications. At times, the entire processing capacity of the HPC system may be dedicated almost 100% to running the distributed application, and other processes may take a back seat. Most, if not all application processes in this scenario, however, make frequent blocking calls to wait for data from other application processes. While waiting, being blocked until data arrive, other processes, e.g. application processes of the same distributed application which are also sending and receiving data, can run. Normally, when the expected data arrive, an interrupt would be used to wake up the blocked process to continue processing.

In the high performance application scenario, it is not unusual, and perhaps even very common, that several application processes could be blocked at the same time, each waiting for data. If each of these application processes need to be woken up with an interrupt each time their expected data arrive, a great deal of computational resources would have to be expended on servicing the interrupts and retrieving the relevant process contexts, address translation tables, and switching from kernel to user mode and back.

Application processes may be categorized into two kinds of tasks; namely, polling tasks (PT) and non-polling tasks (NPT). According to embodiments of the present inventions, a polling task is an application process of a distributed application which, having for example issued an MPI "receive" call to the kernel is allowed to remain in context and polls the hardware for arriving data packets. Only a restricted class of processes may be selected to be PTs. PTs are generally high priority and latency sensitive processes. All other application processes are non-polling tasks. After a currently running polling task (the original PT) issues a blocking MPI "receive" call, the original PT is thus not blocked immediately. One of a small number of possible events may happen next. Such events may include a) the expected data for the original PT arrive, and the PT can continue processing without ever having blocked, or b) the expected data for a different waiting application process (PT or NPT) arrive, in which case that different application process is woken up and can continue processing, while the original PT is blocked, or c) new data for a different application process arrive, but that application has not yet issued the corresponding "receive" call. The new data are sent to a queue (a socket queue, for example) for that application process which will later pick up the data immediately and without blocking as soon as it does make the "receive" call, or d) a non-polling task (NPT) becomes ready to run due to a different event while no polled events have occurred, in which case the waiting application process (the original PT) is blocked and control is passed to the NPT.

Note that an allocated time slice for the original PT might expire before any of the conditions a) to d) occur. However, at that point no other process can be ready to run (otherwise the condition d) would have obtained), and the original PT will be immediately rescheduled. The original PT thus effectively continues to run indefinitely until one of the conditions a) to d) arises.

It may happen that no task is running or ready to run, but data may still be received, the data being destined for a currently blocked task. This can arise after the condition d) when the original PT blocked, the NPT that had taken over blocks or stops, and no other task is ready to run. At that point, other PTs may also be blocked waiting for data. In this case, an idle thread would normally be running in the kernel, and an interrupt would be required to wake up the receiving process. However, embodiments of the present invention enable avoiding this interrupt as well, by substituting (or enhancing) the kernel idle thread with a single "kernel polling thread" that is given a high priority (to be scheduled ahead of most non-polling tasks), and is made persistent, i.e. given an infinite time slice.

When the kernel polling thread detects new data arriving that are destined for a waiting task (the target task of the data), for example a blocked application process, the data are delivered to the target task and the task is made ready to run, e.g. the blocked application process is unblocked.

Software Block Diagram

Figure 3:
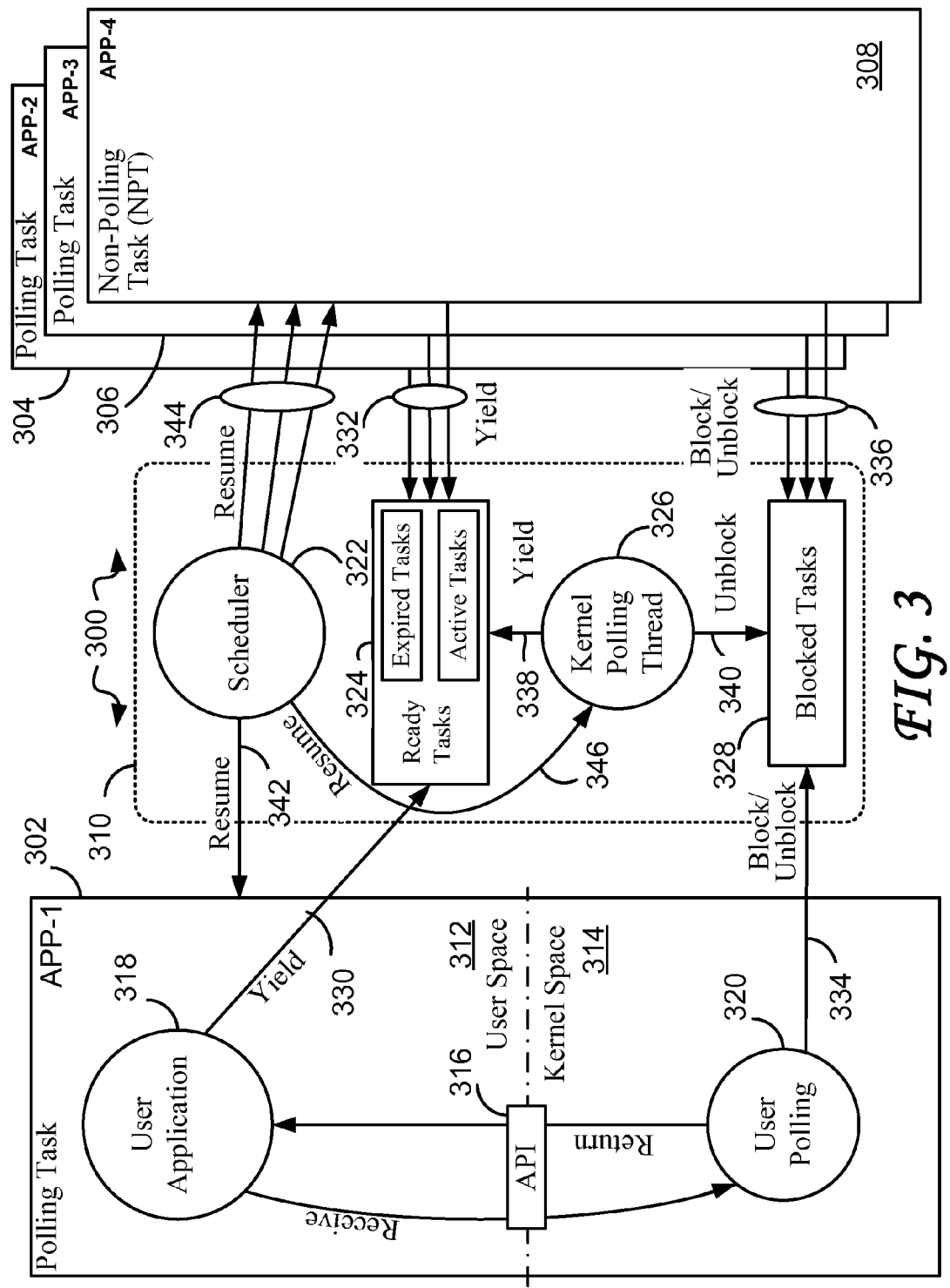
FIG. 3 is a software block diagram 300 that illustrates relationships between applications in a computing module, for example the CM 102 of the multi-processor system 100 of FIG. 1.

FIG. 3 is a software block diagram 300 that illustrates relationships between applications in a computing module, for example the CM 102 of the HPC system 100 of FIG. 1, according to embodiments of the present invention. The software block diagram 300 shows a number of application processes APP-1 to APP-4 (reference numerals 302 to 308), and a grouping of kernel elements 310.

It is understood that the software block diagram 300 is merely an exemplary illustration to assist in the understanding of embodiments of the present invention. A full implementation of the software naturally may include many other components. The number of application processes shown illustrates an arbitrary snapshot of a dynamic system which may include a lesser or greater number of application processes and other tasks (processes). Embodiments of the present invention described herein are based on a Linux operating system, but the scope of the present inventions extends to include within its scope other multi-tasking (multiprocessing) operating systems as those of skill may appreciate.

Embodiments of the present invention also include multicore CPUs and multiple CPUs configured as symmetric multi-processor (SMP) clusters. For the purposes of the following description, each SMP cluster is treated as a single computing module, and the inter-process communication is assumed to be between CMs. The communication between the tasks running in the cores of a multi-core CPUs and in the CPUs of a SMP cluster could be implemented in a manner analogous to the embodiment described below, as may be readily appreciated by persons familiar with the art of operating system design for SMP. For example, hardware packet transmission of data may be bypassed completely when communicating between the cores of a multi-core CPU and more efficient direct memory-to-memory copying (including DMA) may be substituted for sending data between the CPUs of an SMP cluster.

The application process APP-1 (302) may be divided into a user space 312 and a kernel space 314. The meaning of the terms User Space and Kernel Space is well known to persons skilled in the art of computer operating system design. Generally, the functions running in the kernel space ("kernel functions") have processor privileges that permit these functions to access computer hardware directly, while the user applications have reduced processor and memory privileges and make use of, and communicate with, kernel functions through a well-defined Application Process Interface (API) 316.

The application process APP-1 (302) which is a polling task, includes a "User Application" 318 running in the user space and a "User Polling" function 320 running in the kernel space. There may be other kernel functions used by the application process APP-1 (302) but these are outside the scope of this description. In the example being developed herein, the application processes APP-2 and APP-3 (304 and 306) are also polling tasks, and are similar to the application process APP-1 (302). The application process APP-4 (308) is a non-polling task which means that it does not include the User Polling function 320 or any similar polling function. It should be noted that the User Polling function 320, according to an embodiment of the present invention, is not part of a user space program but rather a logical function that the kernel extends to all PTs.

Within the context of the present inventions, it is anticipated that the user of the HPC system 100 (FIG. 1) will create applications in the form of distributed high performance MPI applications. An MPI application is comprised of a plurality of application processes, one or more of which may run concurrently in one, more than one, or all CMs of the HPC system 100 at the same time as other (non MPI) application processes may also run. In communicating with each other, the MPI application processes make frequent use of "send" and "receive" calls to the kernel. The processes of an MPI application are advantageously designated as polling tasks in order to take advantage of the User Polling function 320, which is the logical function that the kernel extends, according to embodiments of the present invention, to application processes that are designated as PTs.

The application process APP-1 (302) may be one of the plurality of processes of the distributed MPI application. The User Application 318 is a run-time instance of a compiled user program, a detailed description of which is outside the scope of this disclosure. However it is expected that the User Application 318 will make frequent calls to inter-process communications functions in general, and to the blocking MPI "receive" function in particular. In a conventional implementation, the MPI "receive" function might immediately block (stop the calling application process), transfer control to the next available other process, and wait until data arrive, signaled by an interrupt that lets the original application resume or continue. According to embodiments of the present invention, however, a call from the User Application 318 to the MPI "receive" function does not block immediately but invokes the User Polling function 320 within the kernel. The MPI programming library also includes non-blocking receive calls but they are not of concern here as they just run as normal.

It may be helpful to also refer to HPC system 100 of FIG. 1 in conjunction with the following description of FIG. 3. The APP-1 (302) of FIG. 3 may be mapped onto the combination of the APP 128 and the PC 134, and includes other kernel functions (not shown in FIG. 1) of the CM 102.

The grouping of kernel elements 310 includes a scheduler 322, a collection of ready tasks 324, a Kernel Polling Thread 326, and a collection of Blocked Tasks 328. The implementation of other kernel elements except for the Kernel Polling Thread 326 is provided by the traditional operating system, and a detailed description of these is outside the scope of this disclosure.

The collection of Ready Tasks 324 includes the tasks (processes) that are ready to run. When the currently running task (process) terminates, yields, or blocks, the Scheduler 322 selects from among the Ready Tasks 324 the next task to run (resume), based on task priority. A task, for example an application process, may block as a result of a call to a blocking kernel function, such as an MPI "receive" call. The collection of Blocked Tasks 328 includes the tasks (processes) that are blocked. When a task is subsequently unblocked, it will run immediately, or it moves into the collection of Ready Tasks 324 to be rescheduled by priority, depending on operating system usage.

For simplicity, the collection of Ready Tasks 324 is illustrated as a single block. Depending on operating system usage, the group of Ready Tasks 324 may be divided into two groups: an "Active" group of tasks which are ready to run and have not consumed their current time slice assignment and an "Expired" group of tasks which are ready to run but have consumed their current time slice assignment. When an active task expires (has consumed its current time slice assignment), it is placed into the expired group. When the Active group becomes empty, the two groups are swapped; i.e., they trade roles and the "Expired" group now becomes the "Active" group. This is important to ensure that even the lowest priority task gets the chance to run its full time slice, if it is not getting blocked for other reasons, even if there are higher priority tasks ready to run in the meantime but are in the "Expired" group.

In the case of yield, an active task voluntarily gives up its remaining time slice and joins the "Expired" group. When a task joins the "Expired" group, it gets a full new time slice to be used when the Expired group becomes the "Active" group later. It is also important to note the fact that when a task yields, it joins the "Expired" group so that lower priority tasks will get the chance to run.

When a task "yields", for example as a result of having expired (run for a predefined time), it is moved into the collection of Ready Tasks 324 ("Expired" group) because it is ready to run, and be rescheduled according to priority, when the "Expired" group becomes the "Active" group. The Kernel Polling Thread 326 is a process that is described in more detail below relative to FIG. 5. The linkages between the various blocks of the software block diagram 300 are shown as linkage arrows labeled with verbs indicating the purpose of the linkage. These linkages are:

"Yield" 330: from the User Application 318 in the APP-1 to the Ready Tasks 324, and equivalently, "Yield" 332: from the other application processes in the APP-2, APP-3, and APP-4, to the Ready Tasks 324;

"Block/Unblock" 334: from the User Polling function 320 in the APP-1 to the Blocked Tasks 328, and equivalently, "Block/Unblock" 336: from the User Polling functions in the APP-2 and APP-3, and possible other kernel functions in the APP-4, to the Blocked Tasks 328;

"Yield" 338: from the Kernel Polling Thread 326 to the Ready Tasks 324;

"Unblock" 340: from the Kernel Polling Thread 326 to the Blocked Tasks 328;

"Resume" 342: from the Scheduler 322 to the APP-1;

"Resume" 344: from the Scheduler 322 to the APP-2, APP-3, and APP-4;

"Resume" 346: from the Scheduler 322 to the Kernel Polling Thread 326.

The "Yield" linkages (330, 332, and 338) indicate that the process or function at the source of the linkage arrow is able to yield and thus be placed into the collection of Ready Tasks 324.

The "Block/Unblock" linkages (334 and 336) indicate that the process or kernel function running in that process at the source of the linkage arrow is able to block itself, i.e. put itself into the collection of Blocked Tasks 328, and is also able to unblock any process that is currently in the Blocked Tasks 328.

The "Unblock" linkage 340 indicates that the Kernel Polling Thread 326 is able to unblock any process that is currently in the Blocked Tasks 328.

The "Resume" linkages (342, 344, and 346) indicate that the Scheduler 322 at the source of the linkage arrows may allow the processes or functions at the tips of the arrows to resume execution from the point at which they last yielded.

User Polling Function

Figure 4:
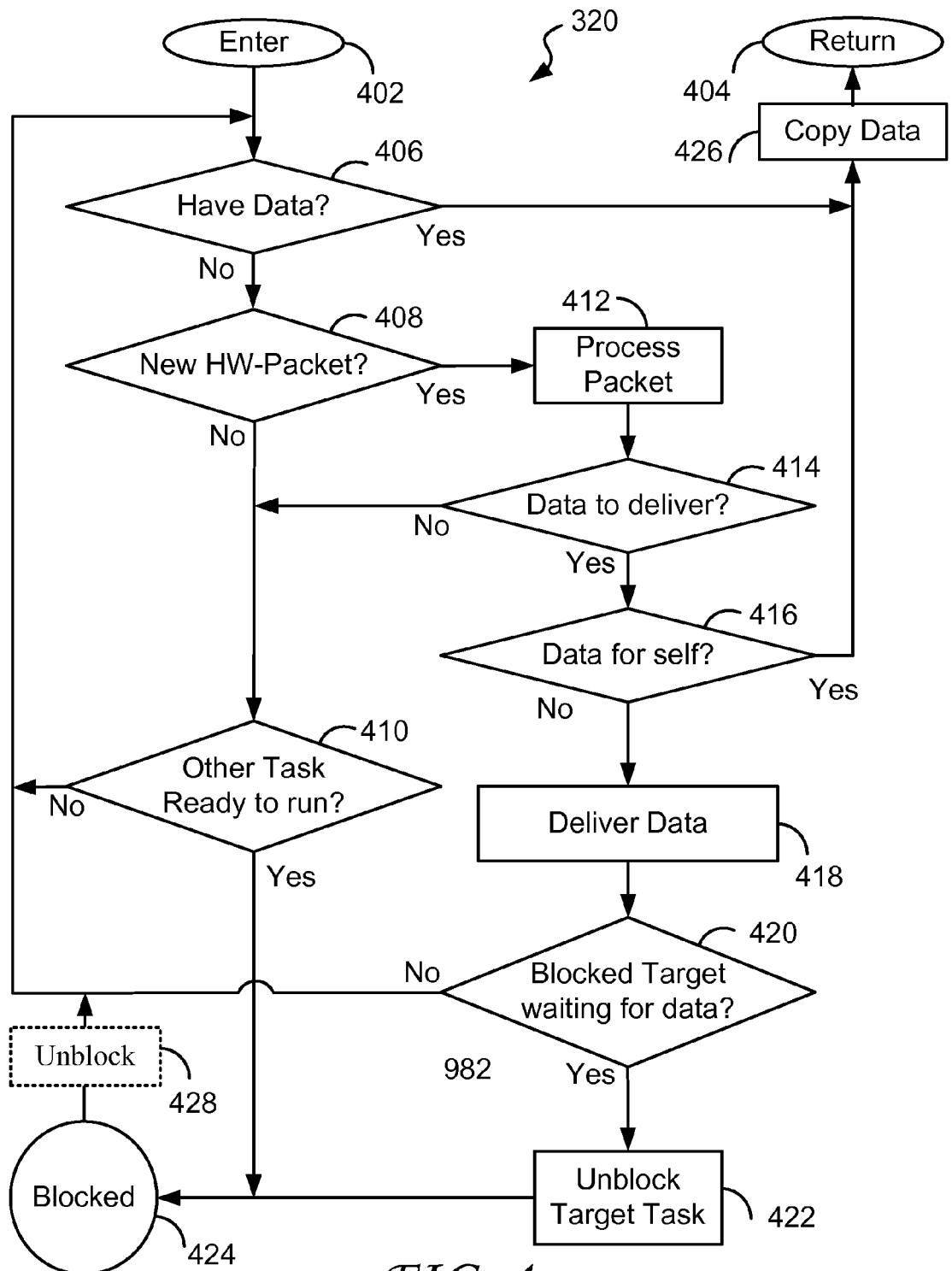
FIG. 4 is a flowchart of the User Polling function 320 of the software block diagram 300 of FIG. 3, according to an embodiment of the present invention.

FIG. 4 is a detailed flowchart of the User Polling function 320 of the software block diagram 300 of FIG. 3. The User Polling function 320 includes an entry point "Enter" 402 and a return point "Return" 404. As shown in FIG. 3, the User Polling function 320 is entered from the application process 318 expecting to receive data, by a "Receive" call, and returns (label "Return") to the application process 318. The steps of the User Polling function 320 include the following decisions (diamond shaped blocks, having one entry and "Yes" and "No" exits), actions (rectangular blocks, having one entry and one exit), and states (circles):

406: "Have Data?" tests whether expected data is already available and ready to be copied to the user space memory of the present application (APP-1). This may be indicated through the process context PC 134 (FIG. 1, not shown in FIG. 3);

408: "New Hardware Packet?" tests whether a new data packet is available in the hardware FIFO 118 (FIG. 1);

410: "Other Task Ready to run?" tests whether any other task is ready to run, by inspecting the collection of Ready Tasks 324 in the kernel elements 310 (FIG. 3);

412: "Process Packet" processes the header of the received data packet to determine the target application process of the packet. This step may also include the processing of the protocol aspects of the packet, such as acknowledgements for example;

414: "Data to Deliver?" tests whether the received data packet has data to deliver to an application process. The packet may just be an acknowledgement or other protocol element that the kernel deals with directly and that contains no data to be delivered to any application process;

416: "Data for self?" tests whether the received data is for the calling application process, i.e. the application process APP 128 (FIG. 1) or the equivalent APP-1 (302, FIG. 3) in the example;

418: "Deliver Data" updates a data-available indicator and reference in the process context (e.g. PC 132) of the target application process (which may be the APP 126 or APP-2, ref 304, in the example or any other process which is not currently running);

420: "Blocked Target waiting for data?" tests whether the target application process (i.e. the APP 126 or the APP-2 in the example) is blocked and waiting for data, by making reference to the collection of Blocked Tasks 328 in the kernel elements 310 (FIG. 3);

422: "Unblock Target Task" unblocks the task (i.e. the APP 126 or the APP-2 in the example) by moving it into the collection of Ready Tasks 324, for example by inserting the task (application process) in the appropriate queue of the Ready Tasks 324 according to the usage of the operating system;

424: "Blocked" state, indicates that the present task (i.e. the APP 128 or the APP-1 in the example) is blocked and has been moved from the group of Ready Tasks 324 into the group of Blocked Tasks 328 according to the usage of the operating system;

426: "Copy Data" copies the data from the hardware buffer (i.e. the FIFO 118, FIG. 1, in the example) to the user memory space of the calling application (the APP 128 or the APP-1 in the example); and 428: "Unblock", an action by the kernel to unblock the present task, i.e. moving it back into the Ready Tasks group 324.

The steps are interconnected as follows:
From "Enter" 402 to "Have Data?" 406;
from "Yes" of "Have Data?" 406 to "Copy Data" 426;
from "No" of "Have Data?" 406 to "New Hardware Packet?" 408;
from "Yes" of "New Hardware Packet?" 408 to "Process Packet" 412;
from "No" of "New Hardware Packet?" 408 to "Other Task Ready to run?" 410;
from "Yes" of "Other Task Ready to run?" 410 to "Blocked" 424;
from "No" of "Other Task Ready to run?" 410 to "Have Data?" 406;
from "Process Packet" 412 to "Data to Deliver?" 414;
from "Yes" of "Data to Deliver?" 414 to "Data for self?" 416;
from "No" of "Data to Deliver?" 414 to "Other Task Ready to run?" 410;
from "Yes" of "Data for self?" 416 to "Copy Data" 426;
from "No" of "Data for self?" 416 to "Deliver Data" 418;
from "Deliver Data" 418 to "Blocked Target waiting for data?" 420;
from "Yes" of "Blocked Target waiting for data?" 420 to "Unblock Target Task" 422;
from "No" of "Blocked Target waiting for data?" 420 to "Have Data?" 406;
from "Unblock Target Task" 422 to "Blocked" 424;
from "Blocked" 424 through "Unblock" 428 to "Have Data?" 406.

In narrative terms, the User Polling function 320 includes a short polling loop including the three decision steps: 406: "Have Data?", 408: "New Hardware Packet?", and 410: "Other Task Ready to run?". The loop will cycle continuously from the bottom (the last step "Other Task Ready to run?" 410) back to the top (the first step "Have Data?" 406) as long as the outcome of every one of the three decision steps is false (exits "No"). If the outcome of the decision step "Have Data?" 406 is true (exit "Yes") then data for the present application has already been received in the hardware and detected by the software, either by the Kernel Polling Thread 326 (see FIG. 5 below), the User Polling function 320 (FIG. 3) running in the context of a different polling task, or as the result of a hardware interrupt, see FIG. 2. If a data packet is thus indicated to be available in the hardware, the payload data of the packet is copied to the application memory space in the next step ("Copy Data" 426) and the User Polling function 320 returns.

If the outcome of the decision step "New Hardware Packet?" 408 is true (exit "Yes") then a new data packet has arrived in the hardware (the FIFO 118). The header of the new data packet is read by accessing the FIFO, without reading the payload. In the next step "Process Packet" 412, the header of the packet is processed, and the target application of the packet (if any) is determined. The packet may not be a data packet but one of a number of other types of packets (e.g. an acknowledgement packet or a maintenance packet), that is processed and dealt with by the kernel. In the following step "Data to Deliver?" 414, it is determined whether the received data packet has data to deliver to an application process. If it does not, the short polling loop continues with the step "Other Task Ready to run?" 410. If the outcome of the decision step "Data to Deliver?" 414 is true (exit "Yes"), then the target of the received data may be the present application process or another application process. If the target is the present application process ("Data for self?" 416 returns "Yes") then the payload data of the packet is copied to the application process memory space in the next step ("Copy Data" 426) and the User Polling function 320 returns. If the target of the received data is not the present application (e.g. APP 128), but another application (e.g. APP 126) then the step "Data for self?" 416 returns "No". In that case, the step "Deliver Data" 418 is performed. In the step "Deliver Data" 418 an indicator or descriptor of the data packet that arrived in the hardware (i.e. FIFO 118, FIG. 1), is stored into the process context (e.g. the PC 132) of the target (e.g. APP 126). The indicator (or descriptor) enables the target to read the actual data from the hardware later. By a manipulation of pointers in the hardware, the data packet may appear to have been removed from the FIFO but it still remains stored in the hardware and needs to be copied into the user process memory space only once, by the target application process when it runs later.

After the data was delivered to the target (the target application process determined in the earlier step "Process Packet" 412) it is necessary to check whether that process is blocked and waiting for data (i.e. in the Blocked Tasks 328), or is already in the ready-to-run state (i.e. in the Ready Tasks 324). If the target application process (target task) is blocked and waiting for data (the decision step "Blocked Target waiting for data?" 420 returns "Yes") then the target task is unblocked in the step "Unblock Target Task" 422, and the present task, i.e. the calling application (APP-1 of FIG. 3, or APP 128 of FIG. 1 in the example) is blocked to reach the "Blocked" state 424 until it is itself unblocked ("Unblock" 428) from another kernel task before it can resume polling. If the target application process (target task) is not blocked or blocked but not waiting for data (the decision step "Blocked Target waiting for data?" 420 returns "No") then the short polling loop starts again from the top with the step "Have Data?" 406.

The decision step at the bottom of the short polling loop is "Other Task Ready to run?" 410. If the outcome of this step is true ("Yes") then another task is ready to run, and the present task must block, i.e. go into "Blocked" state 424 until it is itself unblocked ("Unblock" 428) from another kernel task before it can resume polling.

The User Polling function 320 is merely conducting an opportunistic poll of the hardware—opportunistic because no other task was ready to run, and all other polling tasks are therefore blocked. So the User Polling function 320 is taking advantage of otherwise wasted available CPU instruction cycles to poll the hardware. Furthermore, it is possible, and even likely depending on the structure of the application, that the next received data packet is destined for the present application (APP-1 or APP 128 in the example). In that case, the relevant process context (PC 134) is still valid and does not need to be restored when the packet does arrive. However, when another task is ready to run as determined in the step "Other Task Ready to run?" 410, the User Polling function 320 must stop polling, the current application process must block ("Blocked" state 424), and thus give up the CPU immediately to the scheduler 322 which will select another task to run.

When the present polling task (APP-1 in the example) which includes the User Application 318 and the User Polling function 320, is blocked ("Blocked" state 424) it remains suspended until it is unblocked ("Unblock" 428) by another task. Unblocking may occur as the result of the step "Unblock Target Task" 422 executed in the context of a different APP, for example APP-2, or a similar action by the Kernel Polling Thread 326 (see below). After the present polling task is unblocked, it is placed into the "Active" group in the Ready Tasks 324 from where it will eventually be scheduled to run by the Scheduler 322. At that time, the polling task User Polling function 320 resumes executing at the top of the loop (the step "Have Data?" 406) and may immediately discover that it has had data already delivered to it by a different polling task or by the Kernel Polling Thread 326.

Kernel Polling Thread

Figure 5:
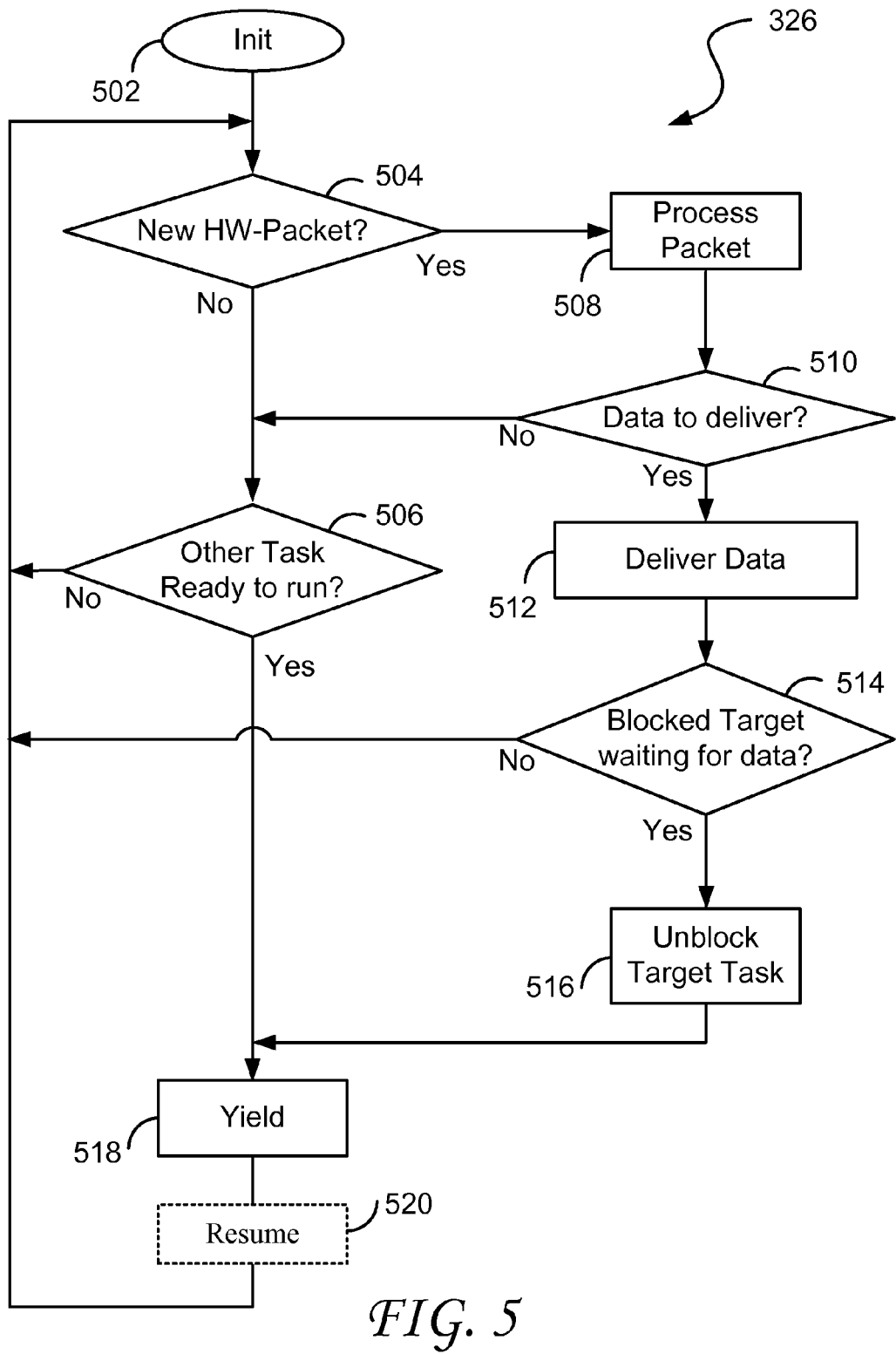
FIG. 5 is a flowchart of the Kernel Polling Thread 326 of the software block diagram 300 of FIG. 3, according to an embodiment of the present invention.

FIG. 5 is a detailed flowchart of the Kernel Polling Thread 326 of the software block diagram 300. The Kernel Polling Thread 326 includes an initial entry point "Init" 502 but no exit because once initialized, the Kernel Polling Thread 326 will loop continuously, stopping only temporarily when it yields. The Kernel Polling Thread 326 yields when it finds that any other task has become ready to run, irrespective of whether that task becomes ready to run due to data delivered by the Kernel Polling Thread 326 or due to some other event for which the task has been waiting. The Kernel Polling Thread 326 joins the Expired group (by yielding) of the Ready Tasks 324 to allow the newly ready task to run even if that task may have a lower priority.

The steps of the Kernel Polling Thread 326 include the following decisions and actions, many of which are equivalent to decision and action steps of the User Polling function 320, having the same names. The reference numerals of the equivalent steps in the User Polling function 320 of FIG. 4 are indicated in parentheses.

504 (408): "New Hardware Packet?" tests whether a data packet is available in the hardware FIFO 118 (FIG. 1);

506 (410): "Other Task Ready to run?" tests whether any non-polling task is ready to run, by inspecting the collection of Ready Tasks 324 in the kernel elements 310 (FIG. 3);

508 (412): "Process Packet" processes the header of the received data packet to determine the target application process of the packet. This step may also include the processing of the protocol aspects of the packet, such as acknowledgements for example;

510 (414): "Data to Deliver?" tests whether the received data packet has data to deliver to an application process. The packet may just be an acknowledgement or other protocol element that the kernel deals with directly and that contains no data to be delivered to any application process;

512 (418): "Deliver Data" updates a data-available indicator and reference in the process context (e.g. PC 132) of the target application process (which may be the APP 126 or APP-2, ref 304, in the example and which is not currently running);

514 (420): "Blocked Target waiting for data?" tests whether the target application process (i.e. the APP 126 or APP-2 in the example) is blocked and waiting for data, by making reference to the collection of Blocked Tasks 328 in the kernel elements 310 (FIG. 3);

516 (422): "Unblock Target Task" unblocks the task (i.e. the APP 126 or APP-2 in the example) by moving it into the collection of Ready Tasks 324, for example by inserting the task (application process) in the appropriate queue of the Ready Tasks 324 according to the usage of the operating system; and 518: "Yield" places the current task (Kernel Polling Thread 326) into the "Expired" group of the Ready Tasks collection 324 and yields control to the scheduler which will select the next ready-to-run task according to the usage of the operating system. If no other task is ready to run then the Kernel Polling Thread 326 will resume immediately.

520: "Resume" an action by the kernel to resume the present task, i.e. when the "Expired" group of the Ready Tasks 324 becomes the "Active" group, as described earlier.

The steps are interconnected as follows:

From "Init" 502 to "New Hardware Packet?" 504;
from "Yes" of "New Hardware Packet?" 504 to "Process Packet" 508;
from "No" of "New Hardware Packet?" 504 to "Other Task Ready to run?" 506;
from "Yes" of "Other Task Ready to run?" 506 to "Yield" 518;
from "No" of "Other Task Ready to run?" 506 to "New Hardware Packet?" 504;
from "Process Packet" 508 to "Data to Deliver?" 510;
from "Yes" of "Data to Deliver?" 510 to "Deliver Data" 512;
from "No" of "Data to Deliver?" 510 to "Other Task Ready to run?" 506;
from "Deliver Data" 512 to "Blocked Target waiting for data?" 514;
from "Yes" of "Blocked Target waiting for data?" 514 to "Unblock Target Task" 516;
from "No" of "Blocked Target waiting for data?" 514 to "New Hardware Packet?" 504;
from "Unblock Target Task" 516 to "Yield" 518; and
from "Yield" 518 through "Resume" 520 to "New Hardware Packet?" 504.

In narrative terms, the Kernel Polling Thread 326 is similar to the User Polling function 320 with the following exceptions: the Kernel Polling Thread 326 does not have a calling application to which to return data, and the Kernel Polling Thread 326 never blocks, it merely yields. The Kernel Polling Thread 326 includes a short polling loop including the two decision steps 504: "New Hardware Packet?" and 506: "Other Task Ready to run?" The loop will cycle continuously from the bottom (the last step "Other Task Ready to run?" 506) to the top (the first step "New Hardware Packet?" 504) as long as the outcome of each of the two decision steps is false (exits "No"). If the outcome of the decision step "New Hardware Packet?" 504 is true (exit "Yes") then a new data packet has arrived in the hardware (the FIFO 118). The header of the new data packet is read by accessing the FIFO, without reading the payload. In the next step "Process Packet" 508, the header of the packet is processed, and the target application of the packet (if any) is determined. The packet may not be a data packet but one of a number of other types of packets (e.g. an acknowledgement packet or a maintenance packet), that is processed and dealt with by the kernel. In the following step "Data to Deliver?" 510, it is determined whether the received data packet has data to deliver to an application process. If it does not, the short polling loop continues with the step "Other Task Ready to run?" 506. However, if the outcome of the decision step "Data to Deliver?" 510 is true (exit "Yes") then the step "Deliver Data" 512 is performed. In the step "Deliver Data" 512 an indicator or descriptor of the data packet that has arrived in the hardware (i.e. FIFO 118, FIG. 1), is stored into the process context of the target application (the target application process determined in the earlier step "Process Packet" 508).

After the data was delivered to the target application, it is necessary to check whether that process is blocked and waiting for data (i.e. in the collection of Blocked Tasks 328, FIG. 3), or merely suspended (for example, because it previously yielded due to its time slice having expired, but is ready to be scheduled to run, i.e. in the collection of Ready Tasks 324). If the target application process (target task) is not blocked or blocked but not waiting for data (the decision step "Blocked Target waiting for data?" 514 returns "No") then the short polling loop starts again immediately from the top with the step "New Hardware Packet?" 504. If the target application process (target task) is blocked and waiting for data (the decision step "Blocked Target waiting for data?" 514 returns "Yes") then the target task is unblocked in the step "Unblock Target Task" 516, and the Kernel Polling Thread 326 yields in the step "Yield" 518, until it is rescheduled to resume ("Resume" 520). When the Kernel Polling Thread 326 resumes after the yield, it starts again at the top of the polling loop, with the step "New Hardware Packet?" 504.

The delayed interrupt method and the kernel polling method of the present invention are techniques to help avoid the waste of CPU cycles in a distributed multi-processor system with a heavy inter processor communication load, such as is encountered in MPI applications and other distributed applications. The average latency is reduced because the Kernel Polling Thread 326 and the User Polling function 320 that runs in the kernel efficiently catch arriving data packets without expensive process switching delays or interrupts.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

The invention claimed is:

1. A method for operating a computer, the computer having a multi-tasking operating system that includes a user space and a kernel in a kernel space, a receive buffer and a plurality of application processes, each of the plurality of application processes including a user application that runs in the user space, the method comprising the steps of:
  polling the receive buffer from a user polling function that runs in the kernel space;
  receiving in the receive buffer a data packet having a header and user data;
  reading the header of the received data packet;
  identifying a target application process of the plurality of application processes from the read header;
  delivering the user data to the identified target application process, and
  if the identified target application process is in a blocked state, changing the blocked target application process to an unblocked state;
  wherein the polling step is carried out by a polling application process that includes the user polling function.

2. The method of claim 1, wherein each of the plurality of application processes is associated with a process context and wherein the method further includes a step of discarding the data packet if the process context of the target application process does not exist.

3. The method of claim 1, wherein the target application process in the delivering step is one of a polling application process and a non-polling application process that does not include the user polling function.

4. The method of claim 1, wherein the polling step is carried out as long as the receive buffer is empty and no other application process is ready to run.

5. The method of claim 1, further comprising the step of each of the plurality of application processes assuming the blocked state when it is waiting for user data.

6. The method of claim 1, wherein, after the polling step is carried out by a first user polling function of a first application process of the plurality of application processes and after the identifying step identifies the target application process as a second one of the plurality of application processes, the method further includes a step of the first application process assuming the blocked state.

7. The method of claim 1, wherein the polling step is carried out such that after a first application process of the plurality of application processes issues a blocking receive call to indicate that it is ready to receive data, the polling step is carried out to poll the receive buffer and the method further includes a step of copying the user data from the receive buffer to the user space of the first application process if the identified target application process is the first application process.

8. The method of claim 1, further including a step of each of the plurality of application processes assuming the blocked state after its associated user application issues a blocking receive call to the kernel indicating that the issuing user application is waiting for data and the identifying step identifies the target application process as being an other one of the plurality of application processes.

9. The method of claim 8, wherein the kernel further carries out a step of changing the other one of the plurality of application processes to the unblocked state to enable the unblocked user application to receive and process the user data of the data packet received in the receive buffer.

10. The method of claim 1 wherein, when the identified target application process is not yet waiting for the data packet received in the receive buffer, the method further includes a step of the kernel sending the user data to a queue from which the identified target application process can remove the user data after having issued a blocking receive call to indicate to the kernel that it is waiting for data, but before the identified target application process assumes the blocked state.

11. The method of claim 1, further including a step of generating a receive buffer interrupt signal after a selectable period of time, the selectable period of time being configured to be started each time a new data packet arrives at an input of the receive buffer, unless the selectable period of time has at least already partially elapsed.

12. The method of claim 11, further including a step of clearing the selectable period of time when the polling step is carried out.

13. The method of claim 11, further including a step of programmatically setting the selectable period of time.

14. The method of claim 1, further including steps of monitoring a fill level of the receive buffer, and generating a receive buffer fill interrupt signal when the receive buffer fills to a selectable fill level.

15. The method of claim 1, wherein the kernel includes a kernel polling thread, and wherein the method further includes a step of the kernel polling thread polling the receive buffer when none of the plurality of application processes are running or are ready to run.

16. The method of claim 15, wherein the kernel polling thread polling step is carried out persistently, yielding and suspending execution only temporarily when one of the plurality of application processes is ready to run.

17. The method of claim 15 wherein, after the kernel polling thread polling step, the method further includes steps of, when a data packet is present in the receive buffer, reading the header of the data packet, identifying the target application process for the user data from the read header, delivering the user data to the identified target application process and changing the state of the target application process to the unblocked state if the target application process is in the blocked state.

18. A computer, comprising:
a multi-tasking operating system having a user space and a kernel in a kernel space;
a receive buffer, configured to receive a data packet having a header and user data;
a plurality of application processes, each of the plurality of application processes including a user application that runs in the user space, at least one of the plurality of application processes being polling application processes that also include a user polling function that runs in the kernel space, each of the plurality of application process being configured to assume an unblocked or a blocked state, the user polling function being configured to poll the receive buffer and, when a data packet is present in the receive buffer, to read the header of the data packet, to identify a target application process for the data packet from the read header, to deliver the user data to the identified target application process and to change a state of the target application process to the unblocked state if the target application process is in the blocked state.

19. The computer of claim 18, wherein each of the plurality of application processes is associated with a process context and wherein the kernel is further configured to discard the data packet if the process context of the target application process does not exist.

20. The computer of claim 18, wherein the user polling function is configured to poll the receive buffer as long as the receive buffer is empty and no other application process is ready to run.

21. The computer of claim 18, wherein each of the plurality of application processes is configured to assume the blocked state when waiting for user data.

22. The computer of claim 18, wherein the user polling function of each of the at least one polling application process is configured to cause its application process to assume the blocked state when the target application process is identified as a application process of the plurality of application processes other than itself.

23. The computer of claim 18, wherein the user polling function of each of the at least one polling application process is configured such that after a first polling application process makes a blocking receive call to the kernel to indicate that it is ready to receive data, but before the first polling application process assumes the blocked state, the user polling function polls the receive buffer and copies the user data from the receive buffer to the user space of the first polling application process if the identified target application process is the first polling application process.

24. The computer of claim 18, wherein each of the plurality of application processes is configured to assume the blocked state after making a blocking receive call to the kernel indicating that the issuing user application is waiting for data and a new data packet for an other one of the plurality of application processes is received in the receive buffer.

25. The computer of claim 24, wherein the kernel is configured to change the other one of the plurality of application processes to the unblocked state to enable the user application of the unblocked application process to receive and process of the user data received in the receive buffer.

26. The computer of claim 18 wherein, when the identified target application process is not yet waiting for the user data in the data packet received in the receive buffer, the kernel is configured to send the user data to a queue from which the identified target application process can remove the user data after having issued a receive blocking call to indicate to the kernel that it is waiting for data, but before the identified target application process assumes the blocked state.

27. The computer of claim 18, further including a delay timer that is configured to generate a receive buffer delay interrupt signal after a selectable period of time, the delay timer being configured to be started each time a new data packet arrives at an input of the receive buffer, unless the selectable period of time has at least already partially elapsed.

28. The computer of claim 27, wherein the delay timer is configured to be cleared when the user polling function reads the header of the data packet from the receive buffer.

29. The computer of claim 28, wherein the selectable period of time is programmatically selectable.

30. The computer of claim 28, further including a fill level monitor coupled to the receive buffer, the fill level monitor being configured to monitor a fill level of the receive buffer and to generate a receive buffer fill interrupt signal when a selectable receive buffer fill level is reached.

31. The computer of claim 18, wherein the kernel further includes a kernel polling thread that is configured to poll the receive buffer when none of the plurality of application processes are running or are ready to run.

32. The computer of claim 31, wherein the kernel polling thread is configured to run persistently, yielding and suspending execution only temporarily when one of the plurality of application processes is ready to run.

33. The computer of claim 31, wherein the kernel polling thread is configured to poll the receive buffer and, when a data packet is present in the receive buffer, to read the header of the data packet, to identify a target application process for the user data from the read header, to deliver the user data to the identified target application process, and to change the state of the target application process to the unblocked state if the target application process is in the blocked state.

* * * * *